US008375907B2

(12) United States Patent
Friedrichs

(10) Patent No.: US 8,375,907 B2
(45) Date of Patent: Feb. 19, 2013

(54) CAMSHAFT ADJUSTING SYSTEM

(75) Inventor: Matthias Friedrichs, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 174 days.

(21) Appl. No.: 12/863,076

(22) PCT Filed: Dec. 18, 2008

(86) PCT No.: PCT/EP2008/067862
§ 371 (c)(1),
(2), (4) Date: Jul. 15, 2010

(87) PCT Pub. No.: WO2009/089983
PCT Pub. Date: Jul. 23, 2009

(65) Prior Publication Data
US 2011/0041788 A1 Feb. 24, 2011

(30) Foreign Application Priority Data

Jan. 19, 2008 (DE) .......................... 10 2008 005 292

(51) Int. Cl.
*F01L 1/34* (2006.01)
(52) U.S. Cl. ................... 123/90.17; 123/90.31
(58) Field of Classification Search ............... 123/90.15, 123/90.17, 90.31
See application file for complete search history.

(56) References Cited

U.S. PATENT DOCUMENTS

| 1,527,456 A | 2/1925 | Woydt et al. |
| 3,516,394 A | 6/1970 | Nichols |
| 5,161,429 A | 11/1992 | Elrod et al. |
| 6,484,678 B2 * | 11/2002 | Kinugawa ................. 123/90.17 |
| 6,920,853 B2 * | 7/2005 | Nakajima et al. .......... 123/90.17 |
| 2003/0168032 A1 | 9/2003 | Miyazaka |

FOREIGN PATENT DOCUMENTS

| DE | 727 987 A | 11/1942 |
| DE | 42 26 798 | 2/1994 |
| DE | 199 22 194 Y | 6/2000 |
| DE | 10 2004 028 869 Y | 1/2006 |
| GB | 2 369 175 Y | 5/2002 |
| GB | 2 415 480 Y | 12/2005 |
| GB | 2 415 745 Y | 1/2006 |
| GB | 2 432 645 | 5/2007 |
| GB | 2 433 974 Y | 7/2007 |
| WO | 95/00748 A | 1/1995 |
| WO | 2006/108494 Y | 10/2006 |

\* cited by examiner

*Primary Examiner* — Zelalem Eshete
(74) *Attorney, Agent, or Firm* — Lucas & Mercanti, LLP; Klaus P. Stoffel

(57) ABSTRACT

A camshaft adjusting system of an internal combustion engine, which has a rotor, a stator, and first and second concentrically arranged camshafts one of which is driven by the stator and the other one of which is driven by the rotor. The camshafts can be rotated relative to one another to change phase angles of at least one cam on the first of the camshafts relative to at least one cam on the second of the camshafts. Hydraulic vane cells between the stator and the rotor control the rotation of the rotor relative to the stator. The total difference in the shapes and positions of the camshafts is smaller than bearing gaps of at least one bearing point between the rotor and the stator, and sealing elements which can be adjusted to the bearing gaps are provided in the bearing gaps between the rotor and the stator.

4 Claims, 1 Drawing Sheet

CAMSHAFT ADJUSTING SYSTEM

This application is a 371 of PCT/EP2008/067862 filed Dec. 18, 2008, which in turn claims the priority of DE 10 2008 005 292.2 filed Jan. 19, 2008, and U.S. 61/057,347, filed May 30, 2008 the priority of these applications is hereby claimed and these applications are incorporated by reference herein.

FIELD OF THE INVENTION

The invention relates to a camshaft adjusting system of an internal combustion engine.

BACKGROUND OF THE INVENTION

Camshafts of internal combustion engines are generally driven by crankshafts via a chain or a toothed belt and, in the process, are continuously adjusted in a closed control circuit, wherein typical adjustment ranges lie within crank angles of 40 to 60°. Crank angles which can be set are deposited in characteristic diagrams. Adjustments take place, for example, hydraulically, fed from the engine oil circuit via an electrically actuated control valve, and permit optimum valve timings for the engine load and engine speed parameters. Depending on the engine concept and number of adjusters, a significant reduction in fuel consumption and exhaust emissions and an increase in the power and torque can thus be achieved.

DE 42 26 798 A1 discloses an internal combustion engine with a camshaft adjusting system for rotating two concentrically arranged camshaft in order to change phase angles of cams on the first of the concentrically arranged camshafts with respect to the cams on the second of the concentrically arranged camshafts. The two concentrically arranged camshafts are an external shaft and an internal shaft each with cams of identical function, wherein the cams arranged on the internal shaft are mounted on the external shaft and are connected to the internal shaft by a carry-along element configured in the form of a bolt connection. By means of a camshaft adjusting system of this type, it is possible to adjust inlet cams relative to outlet cams without parallel inlet and outlet camshafts, as, for example, in the case of double overhead camshaft (DOHC) engines. A disadvantage of camshaft adjusting systems having two concentrically arranged camshafts is the exacting design required if the rotation of the camshafts is intended to be activated by means of vane cells which require exacting component tolerances and bearing clearances for high adjusting speeds. In a vane cell, the radial clearance between the rotor and stator is restricted to a few hundredth of a millimeter. By connecting the rotor and stator to one of the concentrically arranged camshafts each, the radial position of said rotor and stator with respect to each other is also determined by shape differences and positional differences, in particular by concentricity errors, eccentricities and assembly of the concentrically arranged camshafts. The sum of said differences may be significantly greater than the still permissible, function-determining radial clearance between the rotor and stator. A camshaft adjusting system of this type could jam.

SUMMARY OF THE INVENTION

It is the object of the invention to provide a camshaft adjusting system which does not jam and in which the rotation of camshafts connected to the rotor and stator is activated by means of vane cells.

According to the invention, a camshaft adjusting system of an internal combustion engine has a rotor and a stator, in which the rotor is mounted rotatably, and first and second concentrically arranged camshafts, one of which is driven by the stator and the other by the rotor, wherein the first and second camshafts can be rotated with respect to each other in order to change phase angles of cams on the first of said camshafts with respect to cams on the second of said camshafts. At least one vane cell is provided between the rotor and stator. The sum of the shape differences and positional differences between the first and second camshafts is smaller than bearing gaps in at least one bearing point between the rotor and stator, and sealing elements which can be matched to the bearing gaps are provided in the bearing gaps between the rotor and stator. It advantageously emerges with the radial clearance between the rotor and stator, which radial clearance is increased, according to the invention, to an extent greater than the sum of the unfavorable shape differences and positional differences between the first and second camshafts, that the camshaft adjusting system does not jam and the function thereof is reliably ensured. Enlarged bearing gaps caused by the increased radial clearance are closed by sealing elements, and therefore losses in power arising from the enlarged bearing gaps for the adjusting speeds of rotor with respect to stator do not occur.

According to an advantageous refinement of the invention, the sealing elements are designed as sealing strips which are pressed into the bearing gaps by means of spring elements such that bearing gaps of between 0 and 2 mm can be flexibly compensated for even when concentricity differences between the first and second camshafts are variable.

According to another advantageous refinement of the invention, at least one vane element of the vane cell is mounted resiliently between the rotor and stator to provide advantages with regard to construction space and weight in particular in comparison to camshaft adjusting systems in which rotating vanes are used for controlling the rotation of the rotor relative to the stator.

BRIEF DESCRIPTION OF THE DRAWINGS

The invention is described below with reference to preferred exemplary embodiments. In the drawings.

DETAILED DESCRIPTION OF THE INVENTION

Figure 1:
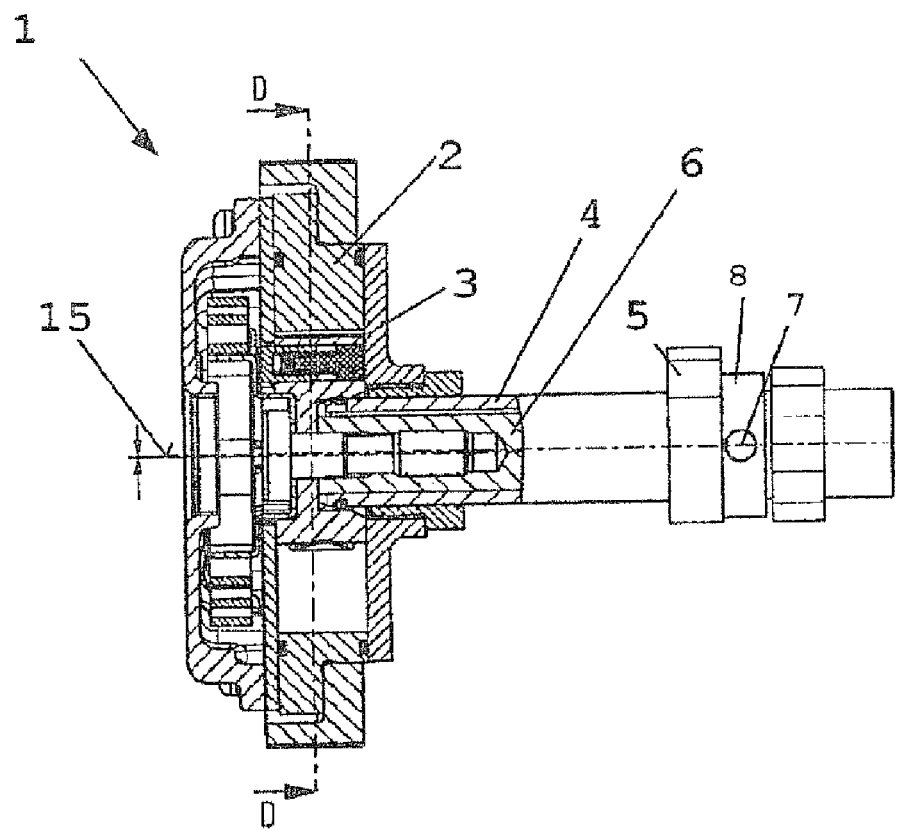
FIG. 1 shows a camshaft adjusting system according to the invention, partially cut open in the longitudinal direction.

FIG. 1: a camshaft adjusting system 1 of an internal combustion engine contains a stator 2 and a rotor 3 which is mounted rotatably in the stator 2. The stator 2 is connected in a rotationally fixed manner to a concentrically arranged first camshaft 4. The camshaft 4 is provided with a cam 5. The rotor 3 is connected in a rotationally fixed manner to a concentrically arranged second camshaft 6 which, via a carry-along element 7 configured in the form of a bolt connection, drives a cam 8 which is mounted on the first camshaft 4. The carry-along element 7 can be rotated in a radial groove (not illustrated) of the first camshaft 4 such that the cam 8 can be phase-adjusted with respect to the cam 5.

Figure 2:
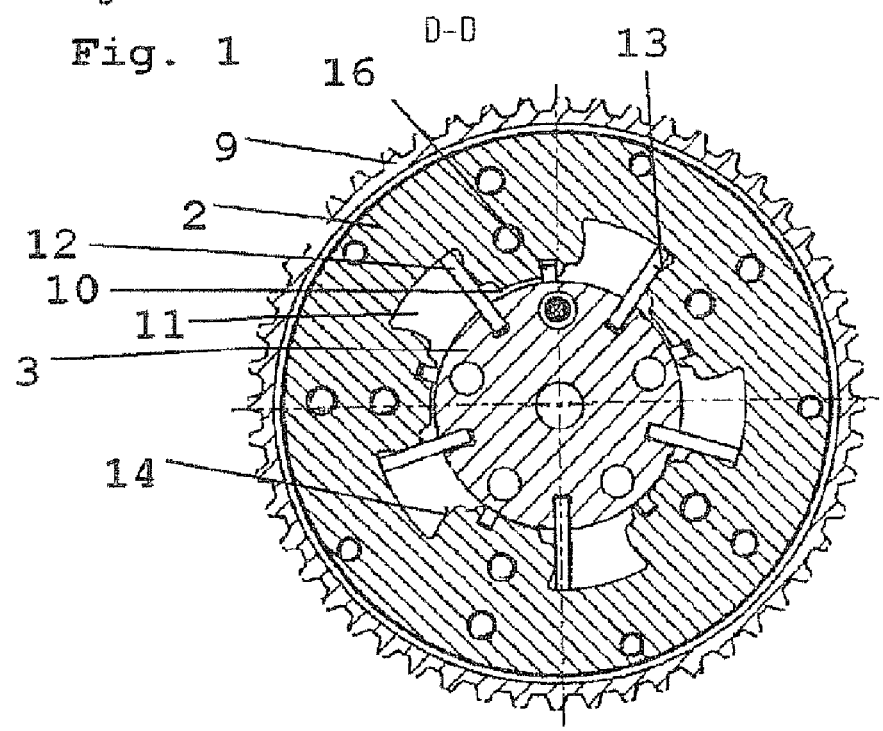
FIG. 2 shows a cross section through the rotor and stator of a camshaft.

FIG. 2: corresponding features are denoted by the reference numbers from FIG. 1. The stator 2 has a toothed ring 9 for a chain (not illustrated) which is driven by a crankshaft of the internal combustion engine. A rotor 3 is mounted rotatably in the stator 2, as a result of which bearing gaps 10 are required between the stator 2 and rotor 3. The coaxial rotation of the rotor 3 relative to the stator 2 is determined by vane cells 11. The vane cells 11 are delimited by chambers in the stator 2, rotor 3 and vane elements 12 and, hydraulically controlled between EARLY and LATE stops 13, 14, can be pivoted about the common axis of rotation 15 of the stator 2 and rotor 3.

Sealing elements 16 which are designed as sealing strips are held in the stator 2 and can be pressed in a flexible manner by means of spring elements into the bearing gaps 10 between the stator 2 and rotor 3. The vane elements 12 are mounted resiliently in a radial direction in the rotor 3.

The invention claimed is:

1. A camshaft adjusting system of an internal combustion engine, comprising:
   a rotor;
   a stator, in which the rotor is mounted rotatably,
   a first camshaft and a second camshaft, which are concentrically arranged with respect to each other, the first camshaft having a first cam and the second camshaft having a second cam, one of the camshafts being driven by the stator and the other of the camshafts being driven by the rotor, the first camshaft and the second camshaft are rotatable with respect to each other in order to change phase angles of the first cam with respect to second cam;
   wherein at least one hydraulic vane cell is provided between the stator and the rotor in order to control rotation of the rotor relative to the stator,
   wherein the rotor and the stator are configured so that bearing gaps are formed in at least one bearing point between the rotor and the stator, the first and second camshafts being configured so that a sum of shape differences and positional differences between the first camshaft and the second is camshaft is smaller than the bearing gaps in the at least one bearing point between the rotor and the stator; and
   sealing elements, which are matchable to the bearing gaps, are provided in the bearing gaps between the rotor and the stator.

2. The camshaft adjusting system of claim 1, wherein the sealing elements are sealing strips which are pressed into the bearing gaps by spring elements.

3. The camshaft adjusting system of claim 1, wherein the vane cell has at least one vane element mounted resiliently between the rotor and the stator.

4. The camshaft adjusting system of claim 1, wherein the rotor and the stator are configured to have a radial clearance that is greater than a sum of the shape differences and the positional differences between the first camshaft and the second camshaft so as to prevent jamming.

\* \* \* \* \*